(12) United States Patent
Reiling et al.

(10) Patent No.: US 12,023,957 B2
(45) Date of Patent: Jul. 2, 2024

(54) METHOD FOR PRODUCING A MOTOR VEHICLE RIM FROM ALUMINIUM OR AN ALUMINIUM ALLOY FOR A WHEEL OF A MOTOR VEHICLE, AND CORRESPONDING MOTOR VEHICLE RIM

(71) Applicant: AUDI AG, Ingolstadt (DE)

(72) Inventors: Jaan Mattes Reiling, Sassenberg (DE); Jan Gaugler, Neckarmühlbach (DE); Marc Hummel, Güglingen (DE)

(73) Assignee: AUDI AG, Ingolstadt (DE)

( * ) Notice: Subject to any disclaimer, the term of this patent is extended or adjusted under 35 U.S.C. 154(b) by 99 days.

(21) Appl. No.: 17/787,728

(22) PCT Filed: Dec. 15, 2020

(86) PCT No.: PCT/EP2020/086101
§ 371 (c)(1),
(2) Date: Jun. 21, 2022

(87) PCT Pub. No.: WO2021/144101
PCT Pub. Date: Jul. 22, 2021

(65) Prior Publication Data
US 2023/0036242 A1 Feb. 2, 2023

(30) Foreign Application Priority Data
Jan. 14, 2020 (DE) .................... 10 2020 100 699.3

(51) Int. Cl.
*B60B 1/08* (2006.01)
*B60B 3/00* (2006.01)

(52) U.S. Cl.
CPC ............... *B60B 1/08* (2013.01); *B60B 3/005* (2013.01); *B60B 2310/202* (2013.01); *B60B 2360/104* (2013.01)

(58) Field of Classification Search
CPC ....... B60B 1/08; B60B 3/06; B60B 2310/202; B60B 1/00; B60B 1/06; B60B 3/002;
(Continued)

(56) References Cited

U.S. PATENT DOCUMENTS

| 2002/0158504 A1* | 10/2002 | Ito ......................... B22D 15/005 301/65 |
| 2009/0236902 A1 | 9/2009 | Zibkoff |
| 2021/0379927 A1* | 12/2021 | Lopes ....................... B60B 3/02 |

FOREIGN PATENT DOCUMENTS

| CN | 1887607 A | 1/2007 |
| DE | 4138558 A1 | 5/1993 |

(Continued)

OTHER PUBLICATIONS

Translation EP2208621 (Year: 2010).*
(Continued)

*Primary Examiner* — Matthew P Travers
(74) *Attorney, Agent, or Firm* — Maier & Maier, PLLC

(57) ABSTRACT

A method for producing an automobile rim made of aluminum or an aluminum alloy for a wheel of an automobile, the automobile rim having a rim bed bounded on opposite sides by an outer flange and an inner flange, a hub with a center recess and a bolt circle, as well as a rim center connecting the rim bed and the hub to one another, the rim center being designed with a plurality of spokes spaced apart in the circumferential direction with respect to the longitudinal center axis of the automobile rim. The automobile rim is produced in one piece and continuously in a casting mold by die casting of a casting material, wherein the automobile rim has, at least in some areas, a low wall thickness not exceeding 15 mm.

8 Claims, 1 Drawing Sheet

(58) Field of Classification Search
CPC ........... B60B 3/005; B60B 3/007; B60B 3/02; B60B 3/10; B60B 19/10; B60B 2360/104; B60B 2310/204; Y10T 29/49503; Y10T 29/49524
See application file for complete search history.

(56) References Cited

FOREIGN PATENT DOCUMENTS

| DE | 20320840 U1 | 3/2005 |
|---|---|---|
| DE | 102016106256 B3 | 3/2017 |
| EP | 0301472 B1 | 4/1991 |
| EP | 1241023 A2 | 9/2002 |
| EP | 1261445 B1 | 11/2003 |
| EP | 2208621 A1 | 7/2010 |
| EP | 2848333 A1 | 3/2015 |
| EP | 3103652 A1 | 12/2016 |
| EP | 3835080 A1 | 6/2021 |
| JP | 2004009889 A | 1/2004 |

OTHER PUBLICATIONS

International Preliminary Report on Patentability with accompanying Translated Written Opinion, issued on Jul. 19, 2022, in corresponding International Patent Application No. PCT/EP2020/086101; 16 pages.
German Office Action, issued on Sep. 23, 2020, in corresponding German Patent Application No. 10 2020 100 699.3; 20 pages.
International Search Report, issued on Jun. 2, 2021, in corresponding International Patent Application No. PCT/EP2020/086101; 5 pages.
Office Action issued on Oct. 19, 2023, in corresponding German Application No. 102020100699.3, 10 pages.

* cited by examiner

METHOD FOR PRODUCING A MOTOR VEHICLE RIM FROM ALUMINIUM OR AN ALUMINIUM ALLOY FOR A WHEEL OF A MOTOR VEHICLE, AND CORRESPONDING MOTOR VEHICLE RIM

FIELD

The invention relates to a method of producing an automobile rim from aluminum or an aluminum alloy for a wheel of an automobile, the automobile rim having a rim bed bounded on opposite sides by an outer flange and an inner flange, a hub with a center recess and a bolt circle, and a rim center connecting the rim bed and the hub to one another, in particular engaging eccentrically on the rim bed in longitudinal section. The invention further relates to an automobile rim.

BACKGROUND

For example, EP 0 301 472 B1 is known from the prior art. The document describes a production method for cast light alloy wheels for passenger cars, in which a near-eutectic refined AlSi alloy is used which—in addition to Al—contains weight fractions of 9.5% to 12.5% silicon and alloying constituents such as a maximum of 0.2% iron, a maximum of 0.05% manganese, a maximum of 0.1% titanium, a maximum of 0.03% copper, a maximum of 0.05% zinc and a maximum of 0.05% each and a maximum of 0.15% in total of other impurities, and wherein the wheels are removed from the casting mold after solidification and cooled. It is provided here that the alloy contains at least 0.05 to at most 0.15% by weight of magnesium and that the wheels are quenched in water at a temperature—measured at their surface—of at least 380° C. on inner areas or areas with mass concentrations, such as the hub and the disc of the wheels, immediately upon removal from the casting mold. Furthermore, a non-generic wheel for a bicycle is known from US 2009/0236902 A1, which has spokes.

SUMMARY

It is the object of the invention to propose a method for producing an automobile rim made of aluminum or an aluminum alloy for a wheel of an automobile, which has advantages over known methods of this kind, in particular enables particularly rapid and cost-effective production of the automobile rim with particularly filigree structures and/or low flow resistance.

The object is achieved by a method of producing an automobile rim. It is provided here that the automobile rim is produced in one piece and continuously in a casting mold by die casting of a casting material, and that the automobile rim has, at least in some areas, a low wall thickness not exceeding 15 mm, the low wall thickness being used in an intermediate spoke region located in the circumferential direction between two of the spokes, so that the two spokes are interconnected by means of an intermediate spoke element produced by die casting, which intermediate spoke element has the low wall thickness at least in some areas, in particular continuously, and/or wherein a ring is formed on the automobile rim, which ring starts from the outer flange, extends inwardly in the radial direction and overlaps the rim center at least in some areas with the low wall thickness.

The automobile rim is usually a component of the automobile's wheel, with several wheels being arranged on the automobile, each of which has said automobile rim. The automobile is in the form of an automobile and in this respect has more than two wheels, in particular exactly four wheels.

The automobile rim is explicitly provided and designed for use in such an automobile designed as an automobile. The automobile rim is therefore not a generic automobile rim, but is intended for use on the automobile and is designed accordingly.

The essential components of the automobile rim are the rim bed, the rim center and the hub. The rim bed and the hub are interconnected via the rim center, at least the rim bed, the rim center and the hub being designed in one piece and as a single material. For this purpose, the rim bed, the rim center and the hub are formed together simultaneously, namely during a single producing step. It is therefore not intended to produce the rim bed, the rim center and the hub separately from one another and to subsequently fasten them to one another. Rather, they are produced together, namely by die casting the casting material in the mold.

The automobile rim has a longitudinal center axis which corresponds in particular to a longitudinal center axis of the hub and preferably coincides or at least almost coincides with a later axis of rotation of the wheel. Viewed in the axial direction with respect to this longitudinal center axis, the rim bed is bounded on opposite sides by the outer flange and the inner flange. In this respect, the outer flange and the inner flange are located on opposite sides of the rim bed and enclose a tire receiving area of the automobile rim between them as viewed in longitudinal section with respect to the longitudinal center axis. The tire receiving area serves to receive a tire which, together with the automobile rim, forms the wheel. The tire receiving area is bounded in the radial direction inwardly by the rim bed and in the axial direction on opposite sides by the outer flange and the inner flange.

The entire automobile rim is particularly preferably bounded in the axial direction or, as viewed in longitudinal section, in a first direction by the outer flange and in a second direction by the inner flange, so that the outer flange and the inner flange define an overall extension of the automobile rim in the axial direction, equal to a width of the automobile rim. When the wheel is mounted on the automobile, the wheel is rotatably supported on a wheel support via a wheel bearing. After mounting of the wheel on the automobile, the outer flange is present on a side of the automobile rim facing away from the wheel carrier and the inner flange is present on a side of the automobile rim facing the wheel carrier.

The outer flange and the inner flange are in the form of a radial projection starting from the rim bed and extending radially outward from the rim bed, again with respect to the longitudinal center axis of the automobile rim. Of course, the outer flange and the inner flange are also formed in one piece and of the same material as the rest of the automobile rim, in particular the rim bed, the rim center and the hub. In this respect, they are formed at the same time as these during the die casting process.

The hub has the center recess and the bolt circle. The center recess is a recess located in the center for receiving a wheel hub of the automobile, to which the wheel is attached during assembly on the automobile. The wheel hub is rotatably mounted on the wheel carrier via the wheel bearing. The bolt circle consists of a plurality of bores arranged along an imaginary circle, each of which serves to receive a fastening means with the aid of which the automobile rim is fastened to the wheel hub. The fastener is, for example, in the form of a screw, bolt or the like.

The rim bed and the hub are connected via the rim center. The rim center is therefore located between the rim bed and the hub, viewed in the radial direction with respect to the longitudinal center axis. Seen in the radial direction, it extends from the hub to the rim bed. The rim center has, for example, several spokes which are arranged or formed at a distance from one another in the circumferential direction. Such a design of the rim center is used in particular to reduce the weight of the automobile rim, but also to achieve better damping. In this respect, the rim center is not solid and continuous in the circumferential direction, but is instead composed of the plurality of spokes spaced from each other in the circumferential direction. Each of the plurality of spokes preferably extends from the hub in the radial direction to the rim bed, thus connecting the hub and the rim bed together. For example, at least three spokes, at least four spokes, at least five spokes, or at least six spokes are provided. For example, at least 10, at least 14 or at least 18 spokes are realized. At most 30 spokes or at most 20 spokes are preferably present. For example, each of the spokes extends in the circumferential direction over at most 30° or less, preferably at most 15° or at most 10°.

It may be provided that the spokes have a constant extension in the circumferential direction, i.e., starting from the rim bed up to the hub. However, a branching of at least one of the spokes or of several or each of the spokes may also be provided, so that the respective spoke is divided into several partial spokes. For example, the spoke initially extends radially outwards from the hub and at a division point splits into a plurality of partial spokes which extend away from one another, in particular in the circumferential direction. After the division point, the partial spokes extend at a distance from one another as far as the rim bed and engage the latter at a distance from one another. It may be provided that a longitudinal center axis of at least one of the spokes, in particular the longitudinal center axis of several or all spokes, intersect the longitudinal center axis of the automobile rim or are even perpendicular to it. This achieves a particularly optimum introduction of force from the rim center or from the spokes into the hub.

The rim center preferably engages off-center on the rim bed in the axial direction or as seen in longitudinal section. This means that it merges—optionally—into the rim bed in the axial direction away from a center point of the rim bed. The rim center preferably engages the rim bed in the axial direction at a distance from the rim center bed that is at least 10%, at least 20%, at least 30%, at least 40% or more relative to a total extension of the rim bed in the axial direction. For example, the rim center merges into the rim bed at the end of the rim bed as seen in the axial direction. In this case, viewed in longitudinal section, the rim center opens into the rim bed in overlap with the outer flange or the inner flange, preferably the former. Due to the off-center rim center engaging the rim bed, after mounting of the wheel on the automobile not only a force acts on the rim center in the radial direction, but also a bending moment in the axial direction or in an imaginary plane accommodating the longitudinal center axis of the automobile rim. Up to now, this has made it necessary to make the rim center correspondingly solid, using a large amount of material. However, the rim center can of course also engage centrally with the rim bed and/or the hub.

Seen in longitudinal section, the rim bed preferably has a greater axial extent than the rim center and the hub. In particular, the axial extent of the rim bed is greater than the axial extent of the hub, which in turn is greater than the axial extent of the rim center. For example, the axial extension of the hub relative to the axial extension of the rim bed is at most 50%, at most 40%, at most 30%, at most 25% or at most 20%. For example, the axial extension of the rim center, relative to the axial extension of the rim bed, is at most 25%, at most 20%, at most 15%, at most 10% or at most 5%. The aforementioned dimensions create a receptacle, encompassed by the rim bed, for the wheel hub and/or a brake disc fastened to the wheel, the wheel hub and/or the brake disc being present in this receptacle after the wheel has been mounted on the automobile. This applies in particular if the rim center is off-center.

The automobile rim is made continuously and uniformly of the casting material, namely aluminum or—preferably—aluminum alloy. This is processed by die casting. In the die casting process, the casting mold is used to form the automobile rim and thus at least the rim bed together with the outer flange and inner flange, the rim center and the hub. The center recess, which can also be referred to as the wheel hub receptacle, is also preferably formed at least in some areas during the die casting process.

Die casting may be performed, for example, at normal pressure or in the presence of negative pressure in the form of vacuum die casting. Vacuum pressure die casting is characterized by the fact that the casting mold is at least in some areas evacuated before and/or during the introduction of the casting material into the casting mold. This means that the casting mold is subjected to a vacuum before and/or during the introduction of the casting material. In this context, the negative pressure is understood to mean a pressure which is lower than an injection pressure at which the casting material is introduced into the casting mold and/or an ambient pressure in an external environment of the casting mold. For example, the negative pressure relative to the external pressure is at most 50%, at most 25%, at most 10% or at most 5%. For example, the residual pressure is between 50 mbar and 200 mbar. The residual pressure is to be understood as the absolute pressure in the casting mold.

The casting mold is evacuated, for example, by means of a vacuum source which is placed in flow connection with the casting mold for this purpose. In particular, the casting mold is evacuated before the casting material is introduced. For example, the casting material is introduced when, in particular only when, a certain vacuum or residual pressure is reached in the casting mold. It may in addition or alternatively be provided to evacuate the casting mold during the introduction of the casting material, i.e., to maintain the flow connection between the vacuum source and the casting mold during the introduction of the casting material into the casting mold and to continue to operate the vacuum source for evacuating the casting mold. This allows particularly filigree structures of the automobile rim to be produced.

It is provided, for example, that the casting mold is first sealed by means of at least one seal, for example by means of a sealing cord, in particular a silicone sealing cord. The casting material is then metered into a casting chamber which is fluidically connected to the casting mold. For this purpose, the casting chamber is at least temporarily fluidically connected to a crucible in which the molten casting material is stored. The casting mold is then subjected to the vacuum and the casting material in the casting chamber is forced into the casting mold, in particular by means of a pressurized piston. The flow connection between the casting chamber and the crucible preferably exists simultaneously, in particular continually. This means that the evacuation of the casting chamber also takes place during the introduction of the casting material.

The spokes of the rim center are formed with the die casting or during the die casting. The automobile rim produced by means of die casting, in particular its spokes, are characterized—purely optionally—by a particularly low wall thickness and/or a curvature with a particularly low radius of curvature and/or by the presence of a demolding surface. The wall thickness is to be understood as the thickness of the wall of the automobile rim at at least one point. The low wall thickness can thus be present, for example, at the rim bed, the outer flange, the inner flange, the rim center and/or the hub. The low wall thickness is particularly preferably present at the rim center. The low wall thickness very preferably represents the greatest wall thickness, for example the greatest wall thickness of the outer flange, the greatest wall thickness of the inner flange and/or the greatest wall thickness of the rim center. Of course, it can also be the largest wall thickness of the rim bed and/or hub.

The low wall thickness is at most 15 mm, at most 10 mm, at most 7.5 mm or at most 5 mm, but is preferably smaller. Thus, for example, it is at most 4 mm, at most 3 mm, at most 2 mm or at most 1.5 mm Conversely, the low wall thickness is particularly preferably at least 1.5 mm or at least 2 mm. In other words, the low wall thickness is, for example, at least 1.5 mm and at most 5 mm, at least 1.5 mm and at most 4 mm, at least 1.5 mm and at most 3 mm, at least 1.5 mm and at most 2 mm, or approximately or exactly 1.5 mm. However, it may also be at least 2 mm and at most 5 mm, at least 2 mm and at most 4 mm, at least 2 mm and at most 3 mm, or exactly 2 mm.

In addition or alternatively to the low wall thickness, the curvature with the small radius of curvature is present. The curvature is a curvature of an outer surface or an outer circumferential surface of the automobile rim. The outer surface bounds a wall of the automobile rim outwardly. The curvature can be present at any point of the automobile rim, for example at the rim bed, the outer flange, the inner flange, the rim center and/or the hub. The curvature is in particular a transition curvature between two surfaces which—seen in section—are angled towards each other and are present, for example, as flat surfaces.

The curvature preferably extends over an angle of at least 30°, at least 45°, at least 60° or at least 90°. The curvature has the small radius of curvature, which is at most 4 mm, but is preferably smaller. For example, the small radius of curvature in this respect thus corresponds, for example, to a radius of curvature not exceeding 3 mm, at most 2 mm, at most 1.5 mm or at most 1 mm Radii of curvature of 2 mm or less are preferred. Conversely, the radius of curvature may in addition be at least 0.25 mm, at least 0.5 mm, or at least 0.75 mm.

In addition or alternatively to the low wall thickness and/or the curvature with the low radius of curvature, the automobile rim may have the demolding surface. The demolding surface is to be understood as a flat surface which directly abuts the casting mold during die casting and along which demolding of the automobile rim from the casting mold takes place after die casting. The demolding surface has an extension at least in the axial direction and in the radial direction and/or—in addition or alternatively—in the axial direction and in the tangential direction, in each case with respect to the longitudinal center axis of the automobile rim. In any case, the demolding surface thus has an extension in two directions perpendicular to one another and to this extent lies completely in the imaginary plane.

Demolding of the automobile rim takes place in the same direction. For example, after die casting, part of the casting mold is displaced in the direction of the longitudinal center axis, i.e., in the axial direction, to open the casting mold and remove the automobile rim from the casting mold. This means that a casting mold surface of the casting mold abutting and forming the demolding surface during die casting is displaced along the longitudinal center axis after die casting. In a conventional method for producing an automobile rim, a demolding angle, i.e., an angle present between the demolding surface and the longitudinal center axis, must be at least 5° to ensure proper demolding.

Due to the integral and continuous formation of the automobile rim by die casting from aluminum or the aluminum alloy, a significantly smaller angle can, however, be realized. The angle between the demolding surface or between the plane completely accommodating the demolding surface and the longitudinal center axis is thus between infinitesimally more than 0° and 4°, including these values in each case. It can thus be provided that the demolding surface runs almost parallel to the longitudinal center axis, so that an almost parallel displacement of the mold surface and the demolding surface occurs during demolding. By the angle of 0° it is to be understood that the plane and the longitudinal center axis lie in one another or run parallel to one another. For example, the angle is at least 0.5°, at least 1° or at least 1.5°. At most, however, an angle of 4° is provided. For example, the angle is at most 3°, at most 2.0°, at most 1.5°, at most 1.0°, or at most 0.5°. Preferred here are the smaller angles not exceeding 2.0° and less.

According to the invention, it is provided that the low wall thickness is used in an intermediate spoke region located in the circumferential direction between two of the spokes, so that the two spokes are interconnected via the intermediate spoke element produced by the die casting process. The intermediate spoke element has—at least in some areas, but in particular continuously—the low wall thickness. The intermediate spoke region in which the intermediate spoke element is formed extends in the circumferential direction between the two spokes and is bounded in the radially inward direction by the hub and in the radially outward direction by the rim bed. To this extent, the intermediate spoke region is present edge-to-edge on the automobile rim.

The intermediate spoke area is now at least in some areas or even completely provided with the intermediate spoke element, so that the area between the two spokes is at least in some areas or even completely closed with the intermediate spoke element. In this case, the intermediate spoke element has the low wall thickness. The two spokes, on the other hand, can have a greater wall thickness than the low wall thickness, for example a wall thickness equal to a first wall thickness, which is in particular more than 5 mm, in particular at least 7.5 mm or at least 10 mm.

It is, however, of course also possible for the two spokes to be designed with the low wall thickness, namely at least partially, in particular only partially or continuously. In this case, the low wall thickness is also used—in particular continuously—for the intermediate spoke element, or a wall thickness that is smaller than the low wall thickness is used. For example, the wall thickness of the intermediate spoke element is smaller than the smallest wall thickness of the spokes bounding it in the circumferential direction. With the aid of the intermediate spoke element, excellent aerodynamic properties are achieved for the automobile rim.

In addition or alternatively to the intermediate spoke element, the ring extending from the outer flange and extending inward in the radial direction and overlapping the rim center at least in some areas is formed on the automobile rim. This ring is formed with the low wall thickness, namely in particular continuously. The latter means that it has a wall thickness which is not greater than the low wall thickness at any point of the ring. In addition, the wall thickness of the ring can of course be continuously constant.

Viewed in the radial direction, the ring extends from the outer flange or the rim bed bounded by the outer flange. It extends radially inward toward the hub and at least in some areas or even completely overlaps the rim center. In the latter case, therefore, the ring extends from the rim bed to the hub as viewed in the radial direction with respect to the longitudinal center axis of the automobile rim. It should be noted here that the ring is always in addition to the spokes of the rim center. In other words, the ring covers the spokes on a side of the automobile rim that faces away from a wheel carrier of the automobile after it has been mounted on the automobile. With respect to the automobile rim, the ring overlaps the spokes on their side facing away from the inner flange, as viewed in longitudinal section.

The ring is preferably configured to at least in some areas or even completely encompass the longitudinal center axis. For example, the ring engages around the longitudinal center axis over at least 90°, at least 180°, at least 270° or by 360°. The ring preferably has a flat outer surface at least in some areas or completely on its side facing away from the rim center or the spokes. The outer surface is preferably planar at least in the circumferential direction over the entire extent of the ring. In addition or alternatively, it is continuously planar in the radial direction. For example, the ring overlaps the rim center in the radial direction by at least 10%, at least 20%, at least 30%, at least 40% or at least 50%, in each case based on the distance between the rim bed and the hub in the radial direction, in other words based on the extent of the rim center in the radial direction.

With the aid of the ring, particularly good aerodynamic properties of the automobile rim are realized.

The procedure described for the production of the automobile rim enables simple, fast and inexpensive formation of the automobile rim, which at the same time has an extremely filigree structure. The rapid production is achieved in particular by die casting, in which the mold is filled much more quickly than in permanent mold casting or low-die casting, which is normally used to produce automobile rims. Overall, therefore, die casting allows the cycle time for producing the automobile rim to be significantly increased, so that a larger number of automobile rims can be produced in the same period of time. The solidification time for die casting is also significantly shorter than for permanent mold casting.

In a development of the invention, the automobile rim is produced in some areas with a first wall thickness exceeding 15 mm, in particular at least 17.5 mm or at least 20 mm, and in some areas with a second wall thickness equal to the low wall thickness. For example, it is provided that the automobile rim is produced in some areas with a first wall thickness exceeding 5 mm, in particular at least 7.5 mm or at least 10 mm, but at most 20 mm, and in some areas with a second wall thickness equal to the low wall thickness. The second wall thickness is preferably at least 1.5 mm or at least 2 mm and at most 15 mm, at most 10 mm, at most 7.5 mm or at most 5 mm, preferably at most 3 mm, at most 2.5 mm or at most 2 mm. The automobile rim thus does not have the completely continuous low wall thickness, but is composed of several parts, some of which have the first wall thickness and others of which have the second wall thickness.

The first wall thickness here is generally greater than the second wall thickness, for example by a factor of at least 1.5, at least 2.0 or at least 2.5. For example, the first wall thickness and the second wall thickness are both implemented in the rim center. Thus, in particular, each of the spokes—if present—may have partly the first wall thickness and partly the second wall thickness. In this way, a particularly high load capacity of the automobile rim is achieved with a simultaneously extremely filigree design. The first wall thickness is particularly preferably implemented on the spokes and the second wall thickness is implemented on the intermediate spoke element and/or the ring.

In a further development of the invention, at least one of the spokes is formed by die casting with a support wall having the larger first wall thickness and at least one decorative wall having the smaller second wall thickness. Each of the spokes is particularly preferably formed as described, such that each of the spokes has at least one such support wall and at least one such decorative wall. The load-bearing wall and the decorative wall differ, for example, in terms of their load capacity in the radial direction. The load-bearing wall or the plurality of load-bearing walls preferably represent more than 50% of the load capacity of the respective spoke, particularly preferably at least 60%, at least 70% or at least 75%. The load capacity is to be understood as the load capacity of the respective spoke in the radial direction between the hub and the rim bed.

The decorative wall or walls of the respective spoke contribute only a minor portion to the load bearing capacity, and supplement the aforementioned load bearing capacity of the at least one load bearing wall to 100%. The load-bearing wall preferably has the continuous first wall thickness. Likewise, it may be provided that the decorative wall has the continuous second wall thickness. The support wall and the decorative wall are connected to each other at least selectively, but preferably continuously. For example, both the at least one support wall and the at least one decorative wall each extend in a radial direction from the hub to the rim bed, in particular parallel to each other. The provision of both the load-bearing wall and the decorative wall enables a sufficiently large load capacity of the automobile rim with a simultaneously filigree appearance.

In a further development of the invention, the support wall and the decorative wall are formed at an angle to one another. The support wall and the decorative wall are thus at an angle to each other which is greater than 0° and less than 180°, namely as seen in cross-section with respect to a longitudinal center axis of the respective spoke. Viewed in cross-section, the support wall has its greatest extension in a first direction and the decorative wall has its greatest extension in a second direction, the first direction and the second direction being at the angle to each other. For example, the decorative wall extends from the support wall or vice versa. At least in cross-section, the support wall preferably has the first wall thickness and the decorative wall has the second wall thickness, each continuously. This realizes a complex structure of the spokes, which leads to a good visual impression of the automobile rim.

In a further development of the invention, the automobile rim is formed such that the ring has an extension in the radial direction which is greater than an extension of the outer flange and/or the inner flange in the same direction by a factor of at least 1.25, at least 1.5, at least 1.75 or at least 2.0. The extension of the ring in this direction has been discussed above, but a different definition has been used. In addition or alternatively, the ring now has the extension mentioned here in the radial direction, which is defined with respect to the extension of the outer flange and the inner flange, respectively. As already explained, the ring directly adjoins the outer flange in the radial direction, i.e., starts from the latter in the radial direction and extends inwards in the radial direction. In this case, the ring is larger in the radial direction than the outer flange and the inner flange, respectively.

In principle, the greater its extension in the radial direction, the greater the aerodynamic advantages that can be achieved by means of the ring. At the same time, however, the weight of the automobile rim is increased by the ring and, in addition, the suspension characteristics of the automobile rim and its visual impression are affected. Also, a ventilation of a wheel brake associated with the automobile rim may be reduced. For this reason, it may be provided to limit the extension of the ring in the radial direction, so that, for example, the extension of the ring in the radial direction is greater than the extension of the outer flange and/or the inner flange in this direction by a factor not exceeding 10, at most 7.5, at most 5 or at most 2.5. In addition or alternatively, it may be provided that the ring overlaps the rim center in radial direction by at most 50%, at most 40%, at most 30%, at most 25% or at most 20%. This achieves an ideal balance between the aerodynamic properties of the automobile rim on the one hand and its suspension properties and appearance on the other.

In a further development of the invention, the intermediate spoke region is bounded in the circumferential direction by the two spokes, in the radially inward direction by the hub or an inner projection extending radially outward from the hub, and in the radially outward direction by the rim bed or an outer projection extending radially inward from the rim bed, and the intermediate spoke element is formed to completely fill the intermediate spoke region. In addition to the above explanations, it is pointed out that the intermediate spoke region does not necessarily have to extend in the radial direction directly to the hub and/or directly to the rim bed. Rather, the inner protrusion, the outer protrusion, or both may be provided, extending from the hub and the rim bed, respectively, in the radial direction toward the respective other element. The intermediate spoke element preferably completely fills the intermediate spoke area. This realizes particularly good aerodynamic properties.

In a further development of the invention, viewed in the circumferential direction, one of the spokes is adjoined on the one hand by the intermediate spoke region and on the other, by a further intermediate spoke region, the intermediate spoke element being designed in the further intermediate spoke region and the intermediate spoke region being free of material. In other words, the spoke is present between and delimits the intermediate spoke region and the further intermediate spoke region, as viewed in the circumferential direction. In this respect, the intermediate spoke region and the further intermediate spoke region are spaced apart from each other in the circumferential direction of the spoke.

The automobile rim preferably has a plurality of intermediate spoke regions and a plurality of further intermediate spoke regions, which—viewed in the circumferential direction—are each formed alternately between the spokes. This means that, viewed in the circumferential direction, one of the plurality of intermediate spoke regions is arranged on one side of each of the spokes, and one of the plurality of further intermediate spoke regions is arranged on the other side. In the further intermediate spoke region, the intermediate spoke element is now present, whereas the intermediate spoke region is free of material, or vice versa. In the intermediate spoke region, therefore, there is just no intermediate spoke element.

In the above-described case of the plurality of intermediate spoke portions and the plurality of further intermediate spoke portions, one of a plurality of intermediate spoke elements is preferably formed in each of the further intermediate spoke portions, whereas each of the intermediate spoke portions is free of material. The intermediate spoke regions are preferably formed congruently, i.e., congruently, with each other. This preferably also applies to the further intermediate spoke regions. Furthermore, the plurality of intermediate spoke elements is preferably also designed to be congruent. This results in the fact that the intermediate spoke elements fill the intermediate spoke regions equally in each case.

It may be provided that the intermediate spoke region is congruently configured with the further intermediate spoke region. However, they may also be non-congruent, for example having different surface areas and/or different shapes. In this way, a particularly striking appearance of the automobile rim can be achieved.

In a further development of the invention, the intermediate spoke region is formed extending further inward in the radial direction than the further intermediate spoke region. Where there are a plurality of intermediate spoke regions and a plurality of further intermediate spoke regions, this preferably applies to each of the intermediate spoke regions and each of the further intermediate spoke regions. The different extensions of the intermediate spoke region and the further intermediate spoke region in the radial direction result, for example, from the division of the spoke into a plurality of partial spokes, in particular into two partial spokes.

The intermediate spoke region, for example, lies between the partial spokes of mutually adjacent spokes, whereas the further intermediate spoke region is arranged between the partial spokes of the same spoke. This means that the further intermediate spoke region extends inward in the radial direction only as far as the division point and is bounded there by the merging partial spokes. The intermediate spoke area, on the other hand, extends in the radial direction beyond the division point as far as the hub. This creates a particularly impressive visual impression.

In a further development of the invention, the intermediate spoke element is produced with a load capacity in the radial direction that is at least 50%, at least 60%, at least 70%, or at least 75% of the load capacity of one of the spokes. The load capacity is understood to be the load capacity in the radial direction between the hub and the rim bed. In this respect, the intermediate spoke element extends in the radial direction from the hub to the rim bed. The load capacity of the intermediate spoke element is to be smaller than the load capacity of one of the spokes, in particular than each of the two spokes. At least, however, the load capacity corresponds to one of the above-mentioned values.

In a further development of the invention, the intermediate spoke element is produced with a load capacity in the radial direction which is at most 50%, at most 40%, at most 30% or at most 25% of the load capacity of one of the spokes. This has also been referred to above. Reference is made to the corresponding explanations.

In a further development of the invention, the automobile rim is made of AlSi10MnMgZn. In this respect, this aluminum alloy serves as the casting material. The aluminum alloy exhibits excellent strength properties for the automobile rim. For example, an AlSi alloy containing the following constituents is used as the casting material: 6.5 wt % to 12.0 wt % Si, a maximum of 0.8 wt % Mn, 0.25 wt % to 0.5 wt % Mg, 0.08 wt % to 0.5 wt % Zn, a maximum of 0.3 wt % Zr, a maximum of 0.025 wt % Sr, a maximum of 0.5 wt % impurities, and the balance Al. The alloy may have at least one of the following optional governing ingredients: a maximum of 0.2 wt % V, a maximum of 0.2 wt % Mo, a maximum of 0.3 wt % Sn, a maximum of 0.3 wt % Co, and a maximum of 0.2 wt % Ti.

Such an alloy is particularly suitable for the production of the automobile rim because it enables the realization of particularly filigree structures. The proportion of Mn is preferably greater than 0 wt. %, for example it is 0.2 wt. % or 0.3 wt. % on the one hand to 0.8 wt. % on the other. For example, the proportion of Mg is at most 0.5 wt %. The proportion of Zn is preferably at most 0.35 wt. %. The proportion of Sr is further preferably greater than 0 wt. %, in particular it is 0.006 wt. % to 0.025 wt. %. The aluminum alloy particularly preferably contains Cr, namely at most 0.3 wt %. The impurities are to be understood as at least one element of the periodic table which is present in the alloy without deliberate addition. The impurities can, of course, also contain several of these elements.

The invention further relates to an automobile rim made of aluminum or an aluminum alloy for a wheel of an automobile, in particular produced in accordance with the embodiments within the scope of this description, wherein the automobile rim has a rim bed bounded on opposite sides by an outer flange and an inner flange, a hub with a center recess and a bolt circle, and a rim center connecting the rim bed and the hub to one another, in particular engaging the rim bed eccentrically in longitudinal section, the rim center being designed with a plurality of spokes spaced apart from one another in the circumferential direction with respect to the longitudinal center axis of the automobile rim.

It is provided here that the automobile rim is produced in one piece and continuously in a casting mold by die casting a casting material, and the automobile rim has a low wall thickness not exceeding 15 mm at least in some areas, the low wall thickness being present in an intermediate spoke area located between two of the spokes in the circumferential direction, so that the two spokes are interconnected by means of an intermediate spoke element which is produced by the pressure die casting and has the low wall thickness at least in some areas, in particular continuously, and/or wherein a ring is formed on the automobile rim, which ring starts from the outer flange, extends inwardly in the radial direction, overlaps the rim center at least in some areas and has the low wall thickness.

The advantages of such a design of the automobile rim or such a procedure for its production have already been referred to above. Both the automobile rim and the method for its production can be further embodied in accordance with the explanations within the scope of this description, so that in this respect reference is made thereto.

BRIEF DESCRIPTION OF THE FIGURES

The invention will be explained in more detail below with reference to the exemplary embodiments shown in the drawings, without any limitation of the invention. In the drawings.

DETAILED DESCRIPTION

Figure 1:
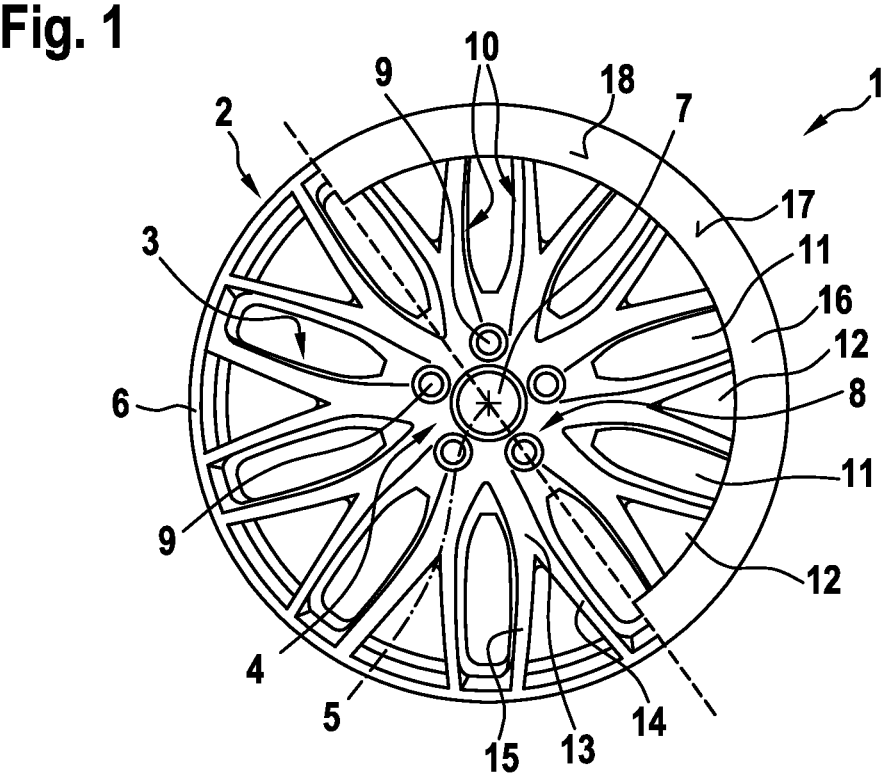
FIG. 1 shows a schematic representation of an automobile rim in a first embodiment.

FIG. 1 shows a schematic representation of an automobile rim 1 in a first embodiment. The automobile rim 1 has as essential components a rim bed 2, a rim center 3 and a hub 4. The automobile rim 1 is shown in axial plan view with respect to a longitudinal center axis 5 of the automobile rim 1. The rim bed 2 is bounded in the axial direction on the one hand by an outer flange 6 and on the other, by an inner flange, which is not shown here, and which each extend outwards from the rim bed 2 in the radial direction with respect to the longitudinal center axis 5. It should also be noted that the axial extent of the rim bed 2 extends to a respective outer end of the outer flange 6 and of the inner flange. Thus, the axial extension of the rim bed 2 includes the axial extensions of the outer flange 6 and the inner flange.

The rim bed 2 and the hub 4 are connected to each other via the rim center 3. The rim center 3 thus engages both the rim bed 2 and the hub 4 and extends from the hub 4 to the rim bed 2. The hub 4 has a center recess 7 which is present centrally in the hub 4 with respect to the longitudinal center axis 5 and extends completely through the hub 4 in the axial direction. In addition, the hub 4 has a bolt circle 8 with a plurality of holes 9, which are marked here only in part by way of example and each serve to receive a fastening means by means of which the automobile rim 1 can be fastened or is fastened to a wheel hub of the automobile.

In the exemplary embodiment shown here, the rim center 3 has a plurality of spokes 10, of which in turn only some are marked by way of example. The spokes 10 are spaced apart from one another in the circumferential direction with respect to the longitudinal center axis 5. Each of the spokes 10 extends from the hub 4 to the rim bed 2. Intermediate spoke regions 11 and further intermediate spoke regions 12 are present in the circumferential direction between the spokes 10. The intermediate spoke regions 11 and 12 are also marked only in part and by way of example.

The spokes 10 each divide into a plurality of partial spokes 14 and 15 at a division point 13. The division point 13 is located between the hub 4 and the rim bed 2 as viewed in the radial direction, for example the division point 13 is arranged at a distance from the rim bed 2 of at least 10% and at most 50% with respect to the distance between the rim bed 2 and the hub 4 in the radial direction. At the division point 13, the spoke 10 divides into the partial spokes 14 and 15, which continue from one another in the circumferential direction and extend from the division point 13 in the direction of the rim bed 2. Here, they run away from each other. The partial spokes 14 and 15 here, for example, each have a straight course and are arranged symmetrically with respect to a longitudinal center axis of the respective spoke 10.

The intermediate spoke regions 11 are now present between adjacent spokes 10, and thus between a partial spoke 14 of a first of the spokes 10 and a partial spoke 15 of another of the spokes 10. The further intermediate spoke regions 12, on the other hand, are present between the partial spokes 14 and 15 of the same spoke, and is thus bounded by the latter in the circumferential direction. It can be clearly seen that, due to the division of the spokes 10 into the partial spokes 14 and 15, the intermediate spoke regions 11 have a greater extension in the radial direction than the further intermediate spoke regions 12.

It is now provided that a ring 16 extends from the outer flange 6, which extends inwardly in the radial direction and overlaps the rim center 3 and thus the spokes 10 at least in some areas. The ring 16 is formed with a low wall thickness not exceeding 15 mm, preferably at most 10 mm, at most 7.5 mm or at most 5 mm. It preferably has a planar outer surface 17, so that particularly good aerodynamic properties of the automobile rim 1 are realized due to the ring 16. The outer surface 17 of the ring 16 particularly preferably merges seamlessly into an outer surface 18 of the outer flange 6, i.e., is aligned with it or is designed to be flush with it, for example.

The outer flange 6 and the ring 16 are in particular configured in such a way that their outer surfaces 17 and 18 are continuously planar and, for example, lie continuously on an imaginary line in the radially inward direction. The outer surfaces 17 and 18 particularly preferably lie continuously in an imaginary plane which is perpendicular to the longitudinal center axis 5. However, the outer surfaces 17 and 18 may also be inclined inwardly so that they lie on a conical surface of an imaginary cone whose longitudinal center axis coincides with the longitudinal center axis 5 of the automobile rim 1.

It should be noted that, for better illustration, the ring 16 is exemplarily shown extending over only a partial circumference of the automobile rim 1. In fact, such an embodiment may be realized. However, the ring 16 particularly preferably extends continuously in the circumferential direction, i.e., uninterrupted.

Figure 2:
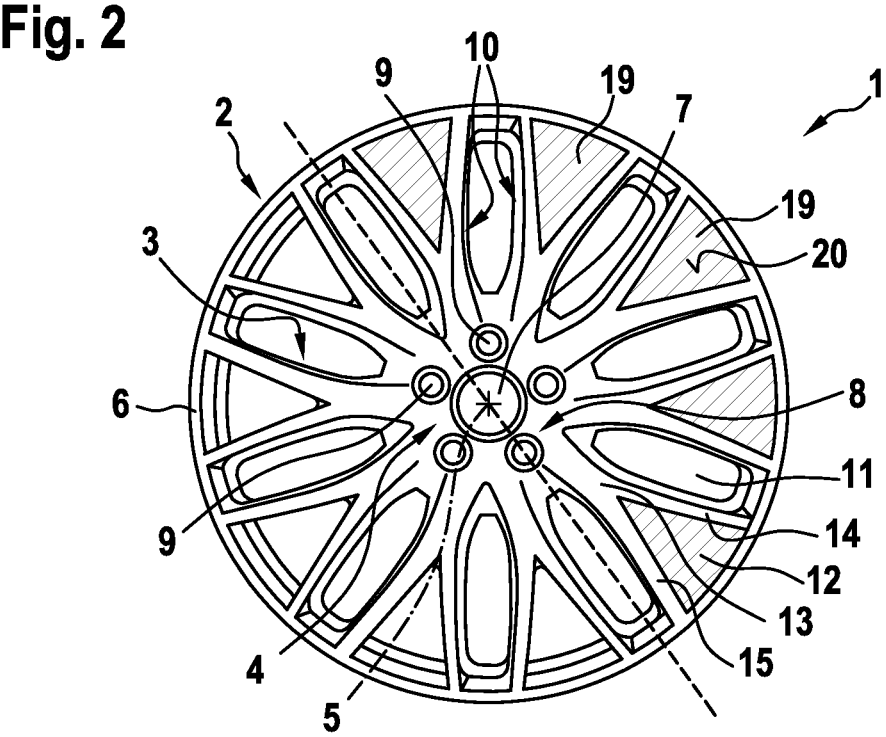
FIG. 2 shows a schematic representation of said automobile rim in a second embodiment.

FIG. 2 shows a second embodiment of the automobile rim 1 in a likewise schematic representation. The second embodiment is similar to the first embodiment, so that reference is made to the above explanations and only the differences between the two embodiments are discussed below. These lie in the fact that the ring 16 is not present, although this may also be the case in the second embodiment. Furthermore, intermediate spoke elements 19 are formed in the further intermediate spoke regions 12, which are designed continuously with the low wall thickness. The intermediate spoke elements 19 completely fill the respective further intermediate spoke region 12. The intermediate spoke areas 11, on the other hand, are designed to be material-free, i.e., open in the axial direction with respect to the longitudinal center axis 5. Also, with such a design of the automobile rim 1, its aerodynamic properties can be significantly improved.

Outer surfaces 20 of the intermediate spoke elements 19 in particular are in each case completely planar and close flush with the spokes 10 or partial spokes 14 and 15 enclosing them, namely in particular on an outer side of the automobile rim 1. Also, in the exemplary embodiment shown here, the intermediate spoke elements 19 are indicated only for a part of the further intermediate spoke regions 12. Although such an embodiment may actually exist, preferably an intermediate spoke element 19 is formed in each of the further intermediate spoke regions 12. Of course, it may also be provided that, for example, as viewed in the circumferential direction, only every second one of the intermediate spoke regions 12 has such an intermediate spoke element 19.

The described embodiment of the automobile rim 1 realizes an extremely filigree appearance and, at the same time, due to the producing of the automobile rim 1 by die casting, ensures a cost-effective and fast producing of the automobile rim 1. In addition, excellent strength values are achieved by means of the die casting of the aluminum or the aluminum alloy.

LIST OF REFERENCE NUMERALS 1 automobile rim
2 rim bed
3 rim center
4 hub
5 longitudinal center axis
6 outer flange
7 center recess
8 bolt circle
9 bore
10 spoke
11 intermediate spoke area
12 intermediate spoke area
13 division point
14 split spoke
15 split spoke
16 ring
17 outer surface
18 outer surface
19 intermediate spoke element
20 outer surface

The invention claimed is:

1. A method for producing an automobile rim from aluminum or an aluminum alloy for a wheel of an automobile, wherein the automobile rim has a rim bed bounded on opposite sides by an outer flange and an inner flange, a hub with a center recess and a bolt circle, as well as a rim center connecting the rim bed and the hub with one another, wherein the rim center is formed with a plurality of spokes spaced apart in a circumferential direction with respect to a longitudinal center axis of the automobile rim, wherein the automobile rim is produced in one piece and continuously in a casting mold by die casting a casting material, and that the automobile rim has, at least in some areas, a low wall thickness not exceeding 15 mm, wherein
  each spoke of the plurality of spokes is adjoined on a first side, in the circumferential direction, by an intermediate spoke region, and is adjoined on a second side, in the circumferential direction, by a further intermediate spoke region, each spoke being present between the intermediate spoke region and the further intermediate spoke region, when viewed in the circumferential direction;
  an intermediate spoke element, produced by die casting and having the low wall thickness at least in some areas, is formed in the further intermediate spoke region, and not in the intermediate spoke region, and
  each spoke is connected to an adjacent spoke, in the circumferential direction, via the intermediate spoke element; wherein the intermediate spoke region is formed extending radially inward from the rim bed, and extends further inward, in a radial direction, than the further intermediate spoke region.

2. The method of claim 1, wherein the automobile rim is produced in some areas with a first wall thickness exceeding 15 mm and in some areas, with a second wall thickness equal to the low wall thickness.

3. The method of claim 2, wherein at least one of the spokes is formed by die casting with one supporting wall which has the first wall thickness, and at least one wall having the second wall thickness.

4. The method of claim 1, wherein:
  a ring is formed on the automobile rim, such that the ring starts from the outer flange, extends inwardly in a radial direction, overlaps the rim center at least in some areas, and has the low wall thickness; and
  the automobile rim is formed in such a way that the ring has an extension in the radial direction which is greater by a factor of at least 1.25, at least 1.5, at least 1.75 or at least 2.0 than an extension of the outer flange and/or the inner flange in the same direction.

5. The method of claim 1, wherein the intermediate spoke region is formed extending further inward in the radial direction than the further intermediate spoke region.

6. The method of claim 1, wherein the intermediate spoke element is produced extending in the radial direction with a load-bearing capacity equal to at least 50%, at least 60%, at least 70% or at least 75% of the load capacity of one of the spokes.

7. The method of claim 1, wherein the intermediate spoke element is produced in the radial direction with a maximum load-bearing capacity not exceeding 50%, at most 40%, at most 30% or at most 25% of the load capacity of one of the spokes.

8. An automobile rim made of aluminum or an aluminum alloy for a wheel of an automobile, the automobile rim comprising: a rim bed bounded on opposite sides by an outer flange and an inner flange, a hub with a center recess and a bolt circle, and a rim center connecting the rim bed and the hub with one another, wherein the rim center is formed with a plurality of spokes spaced apart in a circumferential direction with respect to a longitudinal center axis of the automobile rim, wherein the automobile rim is produced in one piece and continuously in a casting mold by die casting a casting material and that the automobile rim has, at least in some areas, a low wall thickness not exceeding 15 mm, wherein each spoke of the plurality of spokes is adjoined on a first side, in the circumferential direction, by an intermediate spoke region, and is adjoined on a second side, in the circumferential direction, by a further intermediate spoke region, each spoke being present between the intermediate spoke region and the further intermediate spoke region, when viewed in the circumferential direction;

an intermediate spoke element, produced by die casting and having the low wall thickness at least in some areas, is formed in the further intermediate spoke region, and not in the intermediate spoke region, and each spoke is connected to an adjacent spoke, in the circumferential direction, via the intermediate spoke element; wherein the intermediate spoke region is formed extending radially inward from the rim bed, and extends further inward, in a radial direction, than the further intermediate spoke region.

\* \* \* \* \*